US010221792B2

(12) United States Patent
Santillo et al.

(10) Patent No.: US 10,221,792 B2
(45) Date of Patent: Mar. 5, 2019

(54) TWO-STAGE CATALYST REGENERATION

(71) Applicant: Ford Global Technologies, LLC, Dearborn, MI (US)

(72) Inventors: Mario Santillo, Canton, MI (US); Mrdjan J. Jankovic, Birmingham, MI (US); Steve William Magner, Farmington Hills, MI (US); Michael James Uhrich, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1153 days.

(21) Appl. No.: 13/967,911

(22) Filed: Aug. 15, 2013

(65) Prior Publication Data

US 2015/0051812 A1  Feb. 19, 2015

(51) Int. Cl.
*F01N 11/00* (2006.01)
*F02D 41/12* (2006.01)
*F02D 41/02* (2006.01)
*F02D 41/14* (2006.01)

(52) U.S. Cl.
CPC ....... *F02D 41/126* (2013.01); *F02D 41/0235* (2013.01); *F02D 41/0295* (2013.01); *F02D 41/1401* (2013.01); *F02D 41/1454* (2013.01); *F01N 2430/06* (2013.01); *F02D 41/1441* (2013.01); *F02D 41/1456* (2013.01); *F02D 2041/1409* (2013.01);
(Continued)

(58) Field of Classification Search
CPC ........ Y02T 10/47; Y02T 10/22; F01N 11/007; F01N 2430/06; F02D 2200/0814; F02D 41/123; F02D 41/126; F02D 41/1456

USPC .......................................................... 701/104
See application file for complete search history.

(56) References Cited

U.S. PATENT DOCUMENTS 5,979,160 A  * 11/1999  Yashiki et al. .................. 60/276
7,168,242 B2    1/2007  Uematsu et al.
7,497,805 B2 *  3/2009  Seaman et al. ............... 477/185
(Continued)

FOREIGN PATENT DOCUMENTS

CN          1704576 A    12/2005
CN        101042093 A     9/2007
(Continued)

OTHER PUBLICATIONS

Theis, Joseph Robert et al., "NOx Control During Engine Idle-Stop Operations," U.S. Appl. No. 13/565,454, filed Aug. 2, 2012, 62 pages.
(Continued)

*Primary Examiner* — Hai H Huynh
*Assistant Examiner* — Gonzalo Laguarda
(74) *Attorney, Agent, or Firm* — Julia Voutyras; McCoy Russell LLP (57) ABSTRACT

A system and method are described for reducing NOx emissions following deceleration fuel shut off (DFSO). The method comprises: cutting off fuel to the engine during a deceleration event; open loop operating the engine air/fuel ratio rich of stoichiometry for a predetermined time after the deceleration event; feedback controlling the air/fuel ratio on average near a value rich of stoichiometry for a preselected time after said predetermined time; and feedback controlling the air/fuel ratio returning to stoichiometry after the preselected time.

20 Claims, 7 Drawing Sheets

(52) U.S. Cl.
CPC ............... *F02D 2041/1418* (2013.01); *F02D 2200/0802* (2013.01); *F02D 2250/36* (2013.01)

(56) References Cited

U.S. PATENT DOCUMENTS

| | | | |
|---|---|---|---|
| 8,434,297 B2 | 5/2013 | Asanuma et al. | |
| 2002/0038543 A1* | 4/2002 | Nishimura et al. | 60/284 |
| 2003/0159432 A1* | 8/2003 | Kobayashi et al. | 60/274 |
| 2004/0249556 A1* | 12/2004 | Makki et al. | 701/114 |
| 2005/0119822 A1* | 6/2005 | Surnilla et al. | 701/114 |
| 2007/0169465 A1* | 7/2007 | Nakagawa et al. | 60/276 |

FOREIGN PATENT DOCUMENTS

| | | | |
|---|---|---|---|
| CN | 101191442 A | 6/2008 | |
| EP | 1386656 A1 | 2/2004 | |

OTHER PUBLICATIONS

Theis, Joseph Robert et al., "NOx Control During Engine Idle-Stop Operations," U.S. Appl. No. 13/565,490, filed Aug. 2, 2012, 62 pages.

Leone, Thomas G. et al., "Engine Control for Catalyst Regeneration," U.S. Appl. No. 13/868,742, filed Apr. 23, 2013, 50 pages.

Uhrich, Michael James et al., "Integrated Fuel Catalyst Monitor," U.S. Appl. No. 13/892,061, filed May 10, 2013, 33 pages.

State Intellectual Property Office of the People's Republic of China, Office Action and Search Report Issued in Application No. 201410401787.2, dated Mar. 8, 2018, 13 pages. (Submitted with Partial Translation).

* cited by examiner

TWO-STAGE CATALYST REGENERATION

TECHNICAL FIELD

The field of this application relates to engine air/fuel control after a deceleration event in which fuel is cutoff to the engine and air is pumped through the engine into a three-way catalytic converter.

BACKGROUND AND SUMMARY

Gasoline engines are equipped with three-way catalytic converters to oxidize CO and HC engine emissions and reduce NOx emissions. An oxygen sensor and feedback control can be located in the exhaust before the catalyst (referred to as inner fuel loop control), however this part of the system is not the subject of this invention. Rather, a feedback air/fuel control responsive to a narrow band exhaust gas oxygen sensor, located after the catalyst, is commonly used to maintain on average a stoichiometric air/fuel ratio, forming what is known as an outer fuel loop control. When exhaust gasses are lean of stoichiometry (e.g. excess oxygen is detected by the sensor), the sensor will provide a lower voltage and the feedback controller will enrich the air/fuel charge delivered to the engine (either via an open loop command to the injectors or through a command to the inner loop control). If the exhaust gasses are rich of stoichiometry the sensor outputs a higher voltage and the feedback controller correspondingly provides a leaner air/fuel charge. The set point of the sensor output is set at a voltage corresponding approximately to stoichiometry.

During the lean air/fuel transients resulting from feedback control, excess oxygen will oxidize CO and HC in the exhaust stream over the precious metal catalyst surfaces and $O_2$ also will be stored in ceria compounds in the catalyst. During the rich transients, HC and CO will reduce NOx in the exhaust stream over precious metal catalyst surfaces and also reduce cerium oxide that is used as $O_2$ storage. In this way the air/fuel ratio is essentially maintained at stoichiometry. CO and HC emissions will be oxidized and NOx emissions reduced in compliance with government regulations.

Emission control is complicated subsequent to a deceleration event during which fuel is cutoff to the engine cylinders and air is pumped through the cylinders (DFSO). The pumped air may saturate the catalyst oxygen storage. After the deceleration event, when the engine cylinders are again combusting air and fuel, NOx engine emissions may not be reduced in the catalyst because the catalyst is saturated with oxygen and there may not be stored HC and CO to reduce the NOx engine emissions.

To address this problem in prior approaches, the engine was operated open loop (e.g. no feedback control) rich of stoichiometry for a predetermined time after the deceleration event to de-saturate the catalyst oxygen storage. After a predetermined time the engine controller would then commence feedback control with the exhaust gas oxygen sensor tracking stoichiometry as described above.

The inventors herein have recognized numerous issues with the above approach. If the open loop operation rich of stoichiometry fully depleted the oxygen stored during a previous DFSO event, then during subsequent feedback control the rich transient that generates HC and CO engine emissions may not be oxidized across the catalyst surface because there is no stored oxygen available. Further, if not enough oxygen is depleted during the open loop operation, then during subsequent feedback control NOx generated during a lean transient may not be reduced across the catalyst surface.

The inventors herein have solved these issues by open loop operation of the engine air/fuel ratio rich of stoichiometry for a predetermined time after the deceleration event, followed by feedback control of the air/fuel ratio on average around a value rich of stoichiometry for a preselected time after the predetermined time, and feedback control of the air/fuel ratio gradually returning to an average around stoichiometry after the preselected time. Gradually returning the air/fuel ratio to an average around stoichiometry may be based on a number of engine cycles, for example 3 to 10 engine cycles, or may be within an allotted time span. The preselected time may be related to the predetermined time. In this manner, the stored oxygen after a deceleration event is not fully depleted so the HC and CO will be oxidized during a rich transient caused by the air/fuel control. And, the feedback control at a value rich of stoichiometry will reduce the generation of lean transients and resulting NOx generation that may not otherwise have been reduced. Feedback controlling the air/fuel ratio on average around a value rich of stoichiometry may comprise gradually changing the value to stoichiometry during the preselected time. In another aspect of the disclosure, after the deceleration event, the engine air/fuel ratio is operated open loop at a constant air/fuel ratio rich of stoichiometry for a predetermined time before the exhaust gas oxygen sensor positioned downstream of the catalyst switches to a rich state and before oxygen stored in the catalyst is fully depleted, subsequently the engine air/fuel ratio is feedback controlled in response to the exhaust gas oxygen sensor to average around a value rich of stoichiometry for a preselected time after the predetermined time, and the air/fuel ratio is then feedback controlled responsive to the downstream exhaust gas oxygen sensor to average around stoichiometry after the preselected time. During the feedback control following the open loop control, the sensor switch point is set at a value rich of stoichiometry. Thus, lean transients that would have been generated at a stoichiometric switch point are reduced. The NOx that would have been generated during lean transients which might have passed through a catalyst containing too much stored oxygen is avoided. By the time normal feedback control around a stoichiometric sensor set point is commenced, the catalyst will have a proper balance of stored oxygen and NOx breakthrough will not occur.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

Figure 1:
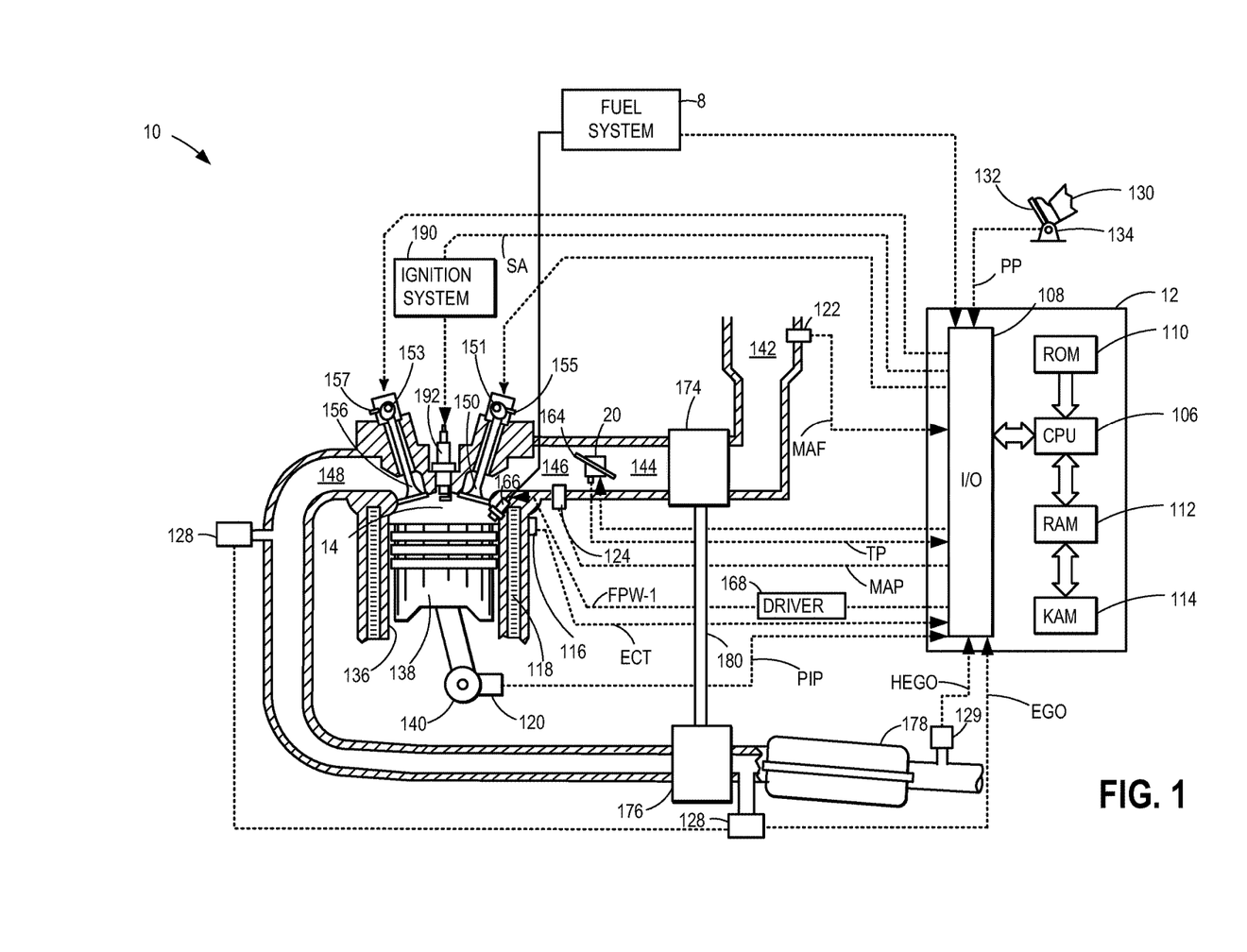
FIG. 1 shows an example cylinder of an internal combustion engine in accordance with the present disclosure.
Figure 2:
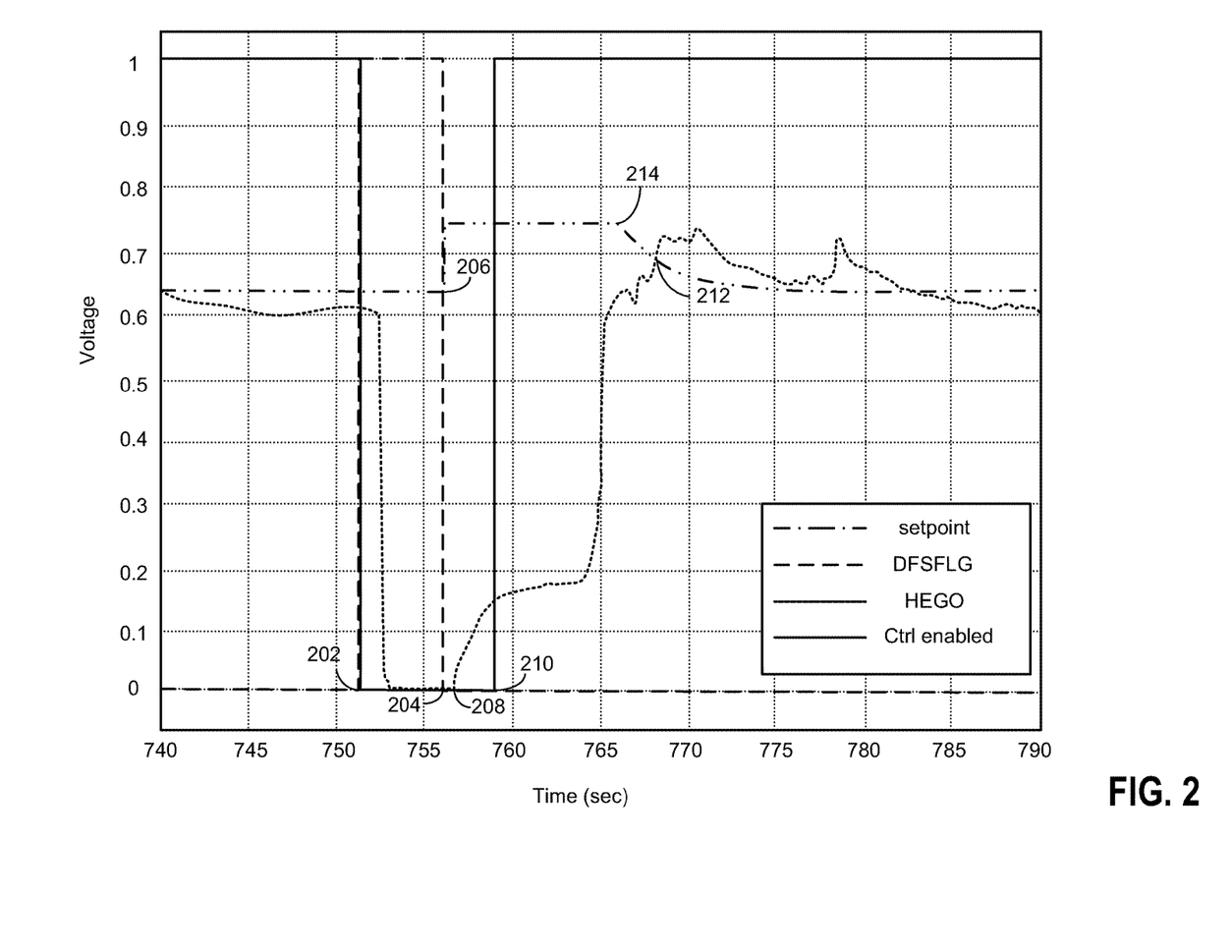
FIG. 2 shows a voltage map of two-stage HEGO set point regulation for DFSO.
Figure 3A:
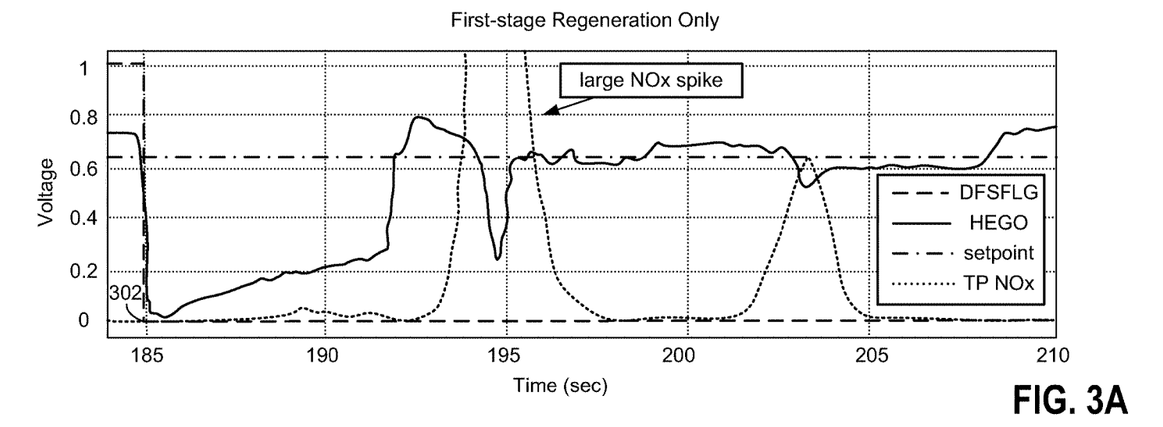
FIG. 3A shows a voltage map of HEGO set point regulation for DFSO for first-stage regeneration alone.
Figure 4:
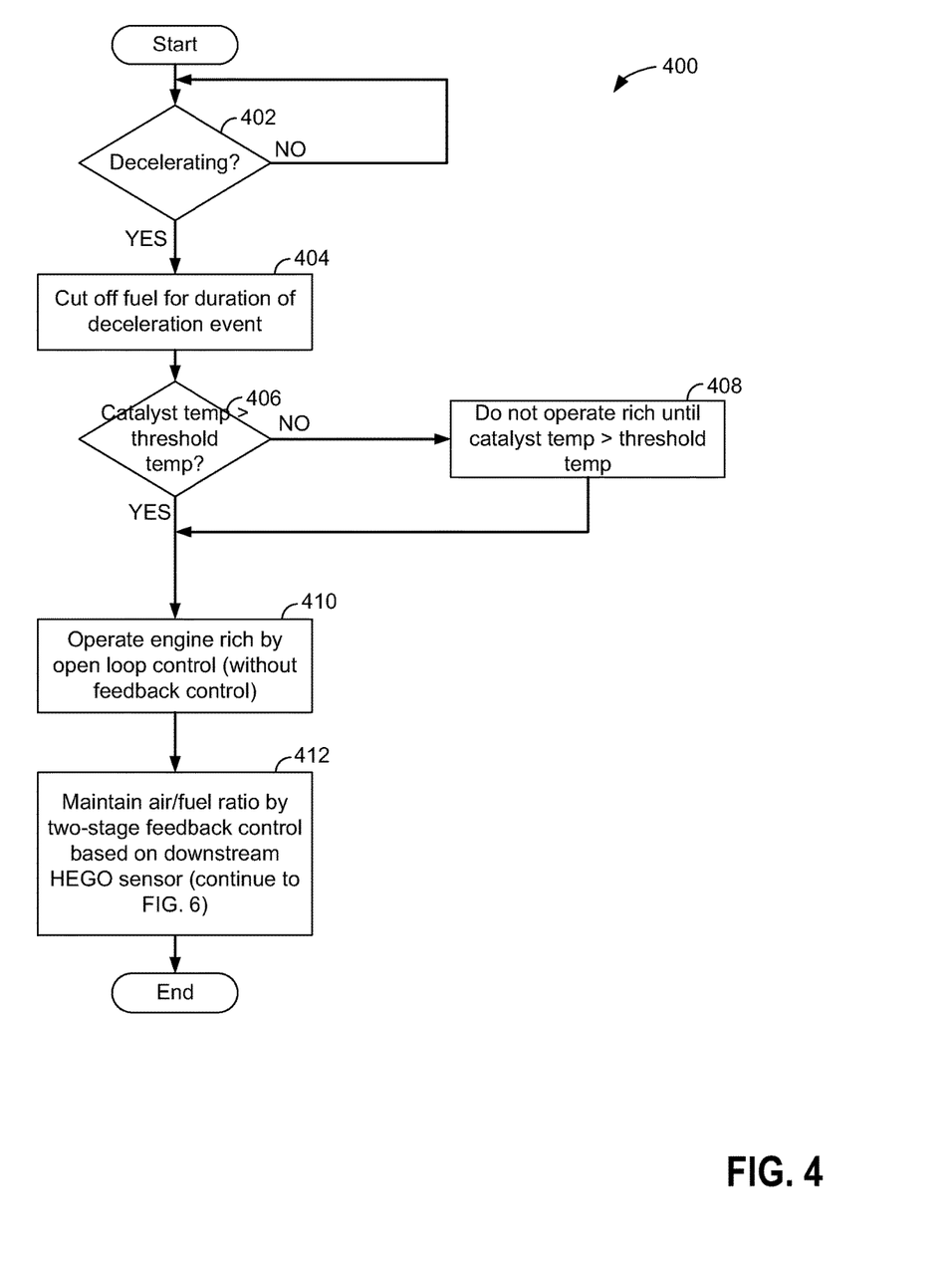
FIG. 4 shows a method of a first embodiment of a two-stage regeneration.
Figure 5:
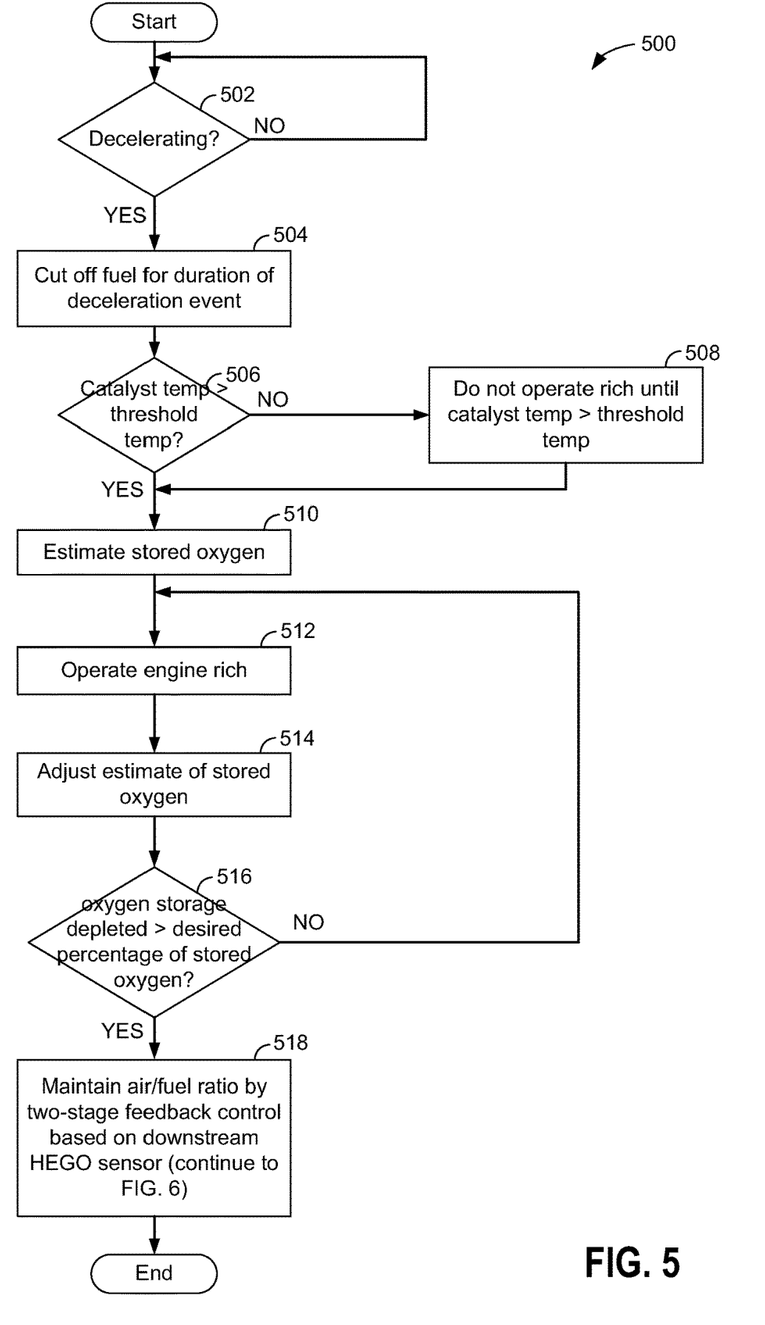
FIG. 5 shows a method of a second embodiment of a two-stage regeneration.
Figure 6:
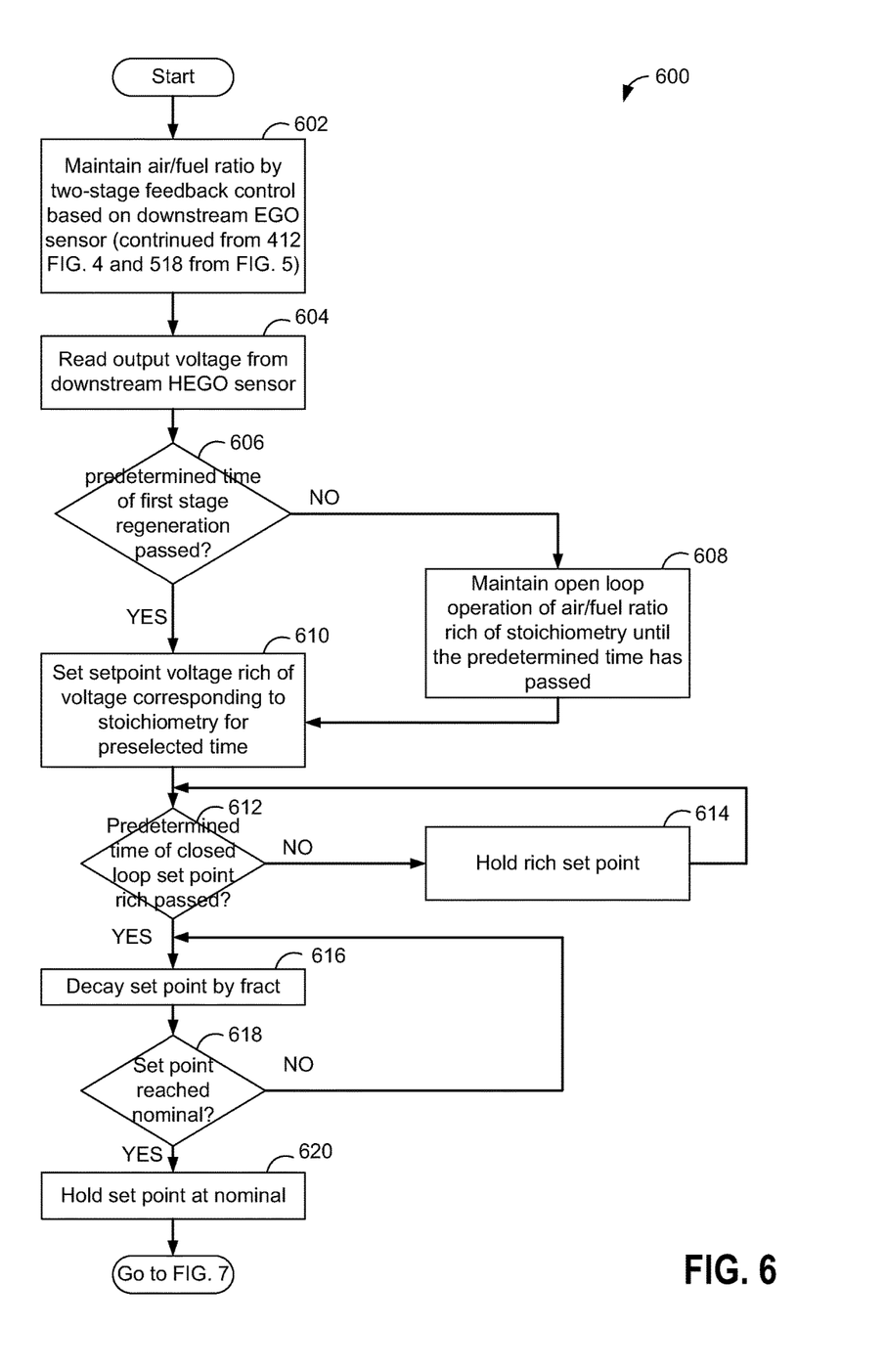
FIG. 6 shows a method of controlling set point voltage during a two-stage regeneration.
Figure 7:
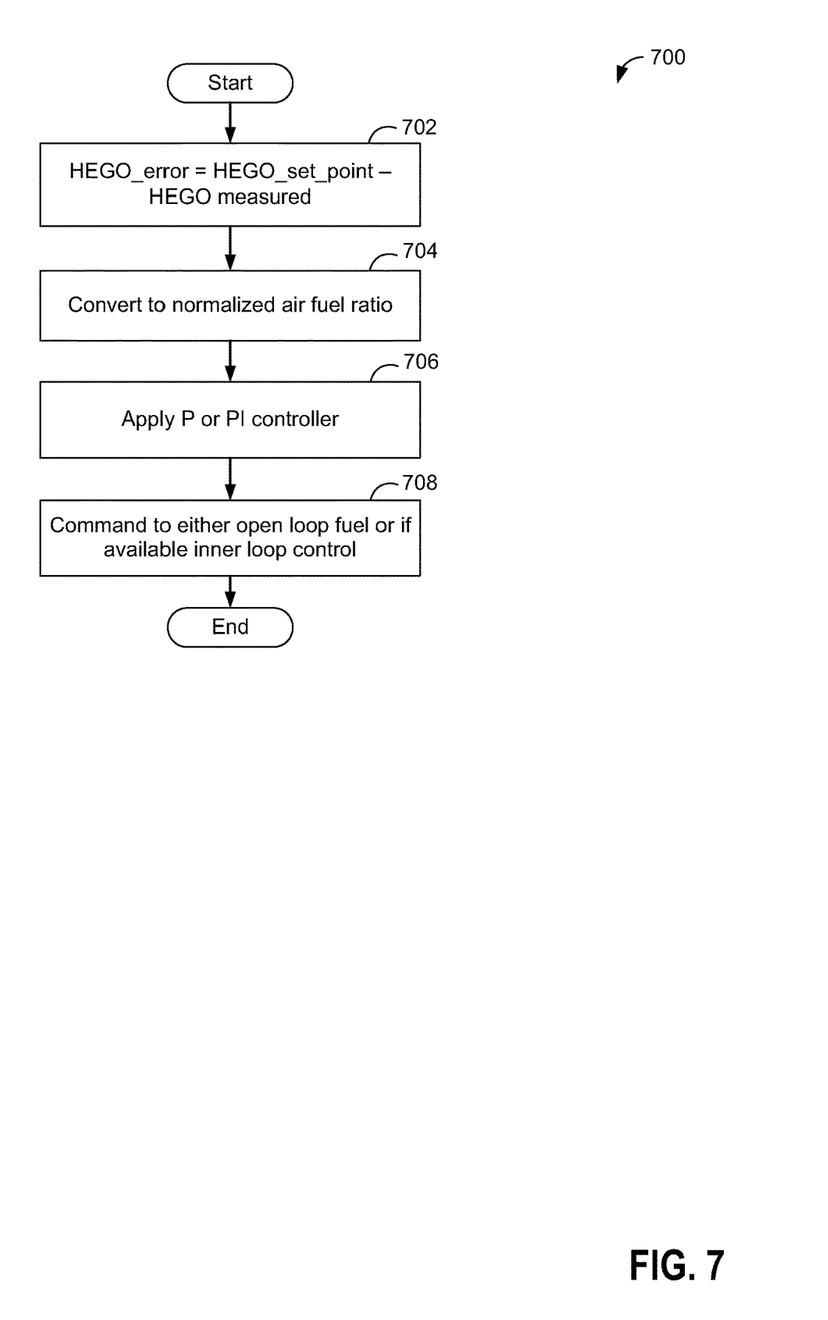
FIG. 7 shows a method of adjusting fuel injection to achieve a desired A/F ratio.

The following description describes methods for minimizing NOx emissions after DFSO by a catalyst regeneration method with a first stage open loop regeneration and a second stage closed loop regeneration. In a first stage air-fuel ratio is controlled by open loop rich operation of the engine for a predetermined time that is sufficiently short to prevent reduction of all the oxygen stored in the catalyst during the DFSO event. In a second stage of the regeneration, the air-fuel ratio is controlled by closed-loop feedback control on average rich of stoichiometry based upon a HEGO sensor positioned downstream from the catalyst device. This second stage of feedback control may allow for reduced NOx emissions and significantly lessen any HC or CO breakthrough the catalyst. The disclosure is described in greater detail below with references to the FIGS. FIG. 1 shows an example cylinder of an engine. FIG. 2 shows an example voltage map of HEGO output and set points for controlling NOx emission after DFSO. FIG. 3A shows an example voltage map of a conventional, single stage regeneration and FIG. 3B contrasts a similar map by showing voltages during a two-stage regeneration. FIG. 4 is a flowchart detailing a first embodiment of a method of the disclosure. FIG. 5 is a flowchart detailing a second embodiment of a method of the disclosure. FIG. 6 shows a method for controlling voltage set points to achieve the two-stage regeneration. FIG. 7 shows how feedback is used to control a fuel pulse width so that air-fuel ratio may be controlled by downstream HEGO feedback.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. A second exhaust gas sensor 128 is shown below turbocharger turbine 176. The two sensors may be different types of exhaust gas sensors, or one may be omitted. Sensor 128 may be selected from among various suitable sensors for providing an indication of exhaust gas air/fuel ratio such as a linear oxygen sensor or UEGO (universal or wide-range exhaust gas oxygen as depicted), a narrow band oxygen sensor or HEGO a NOx, HC, or CO sensor, for example. Emission control device 178 may be a three way catalyst (TWC), NOx trap, various other emission control devices, or combinations thereof. An additional exhaust gas sensor, which may be a HEGO sensor is located downstream of emission control device. HEGO 129 may be involved in providing closed-loop feedback on the status of emission control device 178. Closed loop feedback control responsive to HEGO 129 will operate slower than closed loop feedback control responsive to UEGO 128. And, air/fuel feedback control during the preselected feedback control time following a DFSO event will rely on HEGO 129 to correctly adjust the catalyst storage state.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow thereby reducing EGR transients and improving engine performance.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 1 shows one cylinder of a multi-cylinder engine. As such each cylinder may similarly include its own set of intake/exhaust valves, fuel injector(s), spark plug, etc.

While not shown, it will be appreciated that engine may further include one or more exhaust gas recirculation passages for diverting at least a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

Turning to FIG. 2 a representative example of the two-stage DFSO regeneration method of the present disclosure is shown. The onset of DFSO is indicated at 202 by a peak in the deceleration fuel shut off flag (DFSFLG). DFSO extends from ~751 secs (at 202) to 756 secs where the DFSFLG returns to zero voltage at 204. Also at time 756 the HEGO set point voltage is increased (indicated at 206). Due to the fresh air passing through the catalyst during DFSO, the ceria becomes saturated with oxygen and the downstream HEGO voltage measures a lean condition at the exit of the catalyst. At time 756 sec, the first stage regeneration begins, where the engine is commanded to operate open loop (without feedback control) intentionally rich to begin restoring the catalyst oxygen storage state from fully saturated. At the same time, the HEGO voltage set point is intentionally set higher (richer) than the voltage associated with stoichiometry which will be utilized during the subsequent closed-loop control commencing at time 759. The increased HEGO output at 208 is caused by the open loop rich air/fuel operation for a predetermined time. The predetermined time may be related to oxygen storage capacity of the catalyst, the estimated temperature of the catalyst, or the duration of the deceleration event.

At time 759 the predetermined time ends and open-loop first stage regeneration is over and the outer-loop air/fuel controller closes the control loop using the post-catalyst HEGO 129. At this time, a second stage of regeneration is enabled (indicated at 210) with closed-loop air/fuel control responsive to a comparison of the output voltage of HEGO 129 to the set point for a preselected time. The preselected time may be set based on the oxygen storage capabilities or temperature of a specific catalyst and may be saved within read only memory 110. The HEGO set point is set at 0.75 volts in this example which is rich of the HEGO voltage associated with stoichiometry (0.65 volts in this example). The HEGO voltage is held constant until time 765 and then begins to gradually decay (indicated at 214) until it reaches the voltage associated with stoichiometry at time 776 in this example.

As described in greater detail later herein with particular reference to FIGS. 6 and 7, when the HEGO voltage is less than the set point, an indication is provided that the exhaust air/fuel ratio is lean of the set point. In response the air/fuel controller will increase the pulse width of the signal driving the fuel injectors resulting in more fuel injected into the engine and lowering the air/fuel ratio. This drives the HEGO sensor to a higher output voltage and the air/fuel feedback control process continues. Continuing with FIG. 2, the HEGO voltage continues to rise until it rises above the set point voltage at time 768 (indicated at 212). An indication is then provided that the exhaust air/fuel is rich of the set point and, in response, the air/fuel controller will decrease the fuel injector pulse width which will increase the exhaust air/fuel ratio. The process continues as described above with the air/fuel controller hunting for the air/fuel associated with the set point voltage. During the second stage regeneration the air/fuel will essentially be biased rich because the set point is set rich. When the set point is set at a stoichiometric value at the end of the second stage, the air/fuel will essentially hover around the stoichiometric value.

The addition of a second stage catalyst regeneration immediately when control is passed to the outer-loop air/fuel controller affords the benefit of increased robustness to lean breakthroughs at the exit of the catalyst following a DFSO event.

If only a first stage open-loop regeneration were utilized for a longer time, the catalyst would run the possibility of entirely depleting its oxygen storage. Subsequent to potential catalyst oxygen storage depletion, the catalyst may be exposed to CO breakthrough during transient rich operation. Further, using only first stage open-loop regeneration would leave the catalyst susceptible to lean breakthroughs, and subsequent NOx generation during tip-in maneuvers following DFSO events (which is a common sequence of events). In particular, with first-stage open-loop regeneration only, the HEGO voltage may overshoot the set point (set at stoichiometry in prior approaches) and the air/fuel feedback controller will subsequently command a lean air/fuel ratio. If a tip-in occurs at this time, NOx breakthrough may result. A comparison of a single stage only and two stage regeneration may be seen in FIGS. 3A and 3B as an example of this point and to highlight potential differences between known methods (FIG. 3A) of catalyst regeneration following DFSO and the method of the present disclosure (FIG. 3B).

Turning to FIG. 3A, a representative sample of a one-stage open loop catalyst regeneration method is shown. This method is analogous to known methods of catalyst regeneration following DFSO. In FIG. 3B a two stage method of regeneration is shown. In the two-stage method a first open-loop stage occurs for a predetermined time after DFSO ends and a second closed-loop regeneration stage starts and continues for a preselected time. In both FIGS. 3A and 3B DFSO was initiated out of frame and ends at time 186 seconds, indicated at 302.

In FIG. 3A the first stage open-loop regeneration ends when CO or HC breakthrough is indicated when the HEGO output voltage exceeds the set point (at approximately time 193 in this example) which is set at a voltage corresponding to stoichiometry. As the HEGO output voltage overshoots stoichiometry, the air/fuel feedback controller will make lean corrections reducing fuel injected into the engine resulting in an overall lean air/fuel ratio as seen between times 194 and 195 in this particular example. If a tip-in (i.e., acceleration) occurs during this time of lean engine operation a large NOx spike may occur.

Figure 3B:
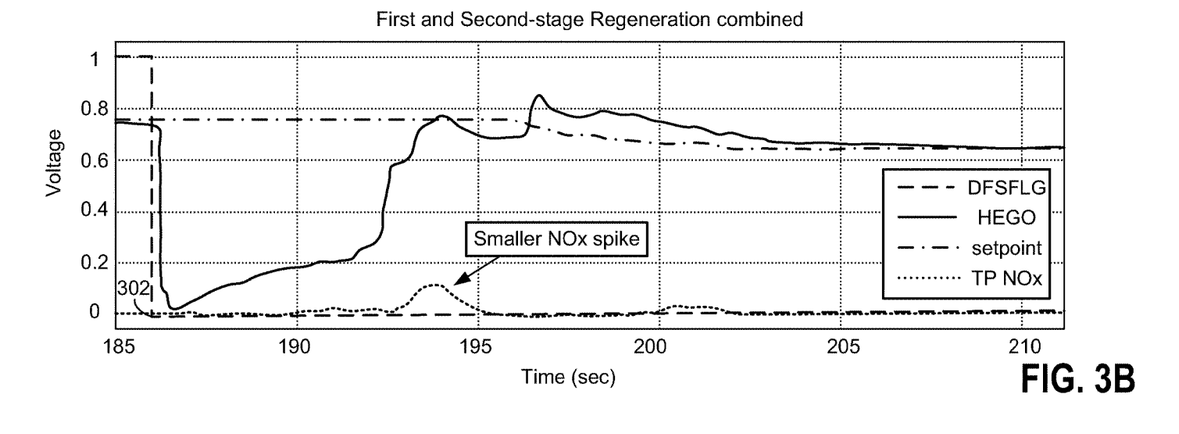
FIG. 3B shows a voltage map of HEGO set point regulation for DFSO after a first and second-stage regeneration.

This large NOx spike is not seen in FIG. 3B where, after a first stage of open-loop operation, a second, closed-loop stage is enabled. Whereas the first stage open-loop regeneration described with reference to FIG. 3A ended when CO was detected breaking through the catalyst, the first stage open-loop regeneration described with reference to FIG. 3B ends after a predetermined time. And, the second stage closed-loop regeneration commences with a HEGO set point that is set to a voltage richer than the voltage associated with stoichiometry (0.75 in this example). As seen in FIG. 3B the HEGO output voltage does not exceed the rich set point at approximately time 194, thus unlike the configuration described with reference to FIG. 3A, the air/fuel feedback controller does not make excessive lean corrections at approximately time 194. Accordingly, a tip-in at this time will not result in an excessive NOx spike and NOx will not break through the catalyst.

In summary, using only first-stage regeneration leaves the catalyst susceptible to lean breakthroughs (and subsequent $NO_x$ generation) during tip-in maneuvers following DFSO events. In contrast, the addition of second-stage closed-loop regeneration results in a significantly smaller $NO_x$ spike. These results can be explained by the control action following DFSO regeneration. With first-stage regeneration only, the HEGO voltage overshoots the set point and the air/fuel controller subsequently commands a lean air-to-fuel ratio to achieve the set point near stoichiometry. By combining the first and second-stage regenerations, the HEGO voltage does not overshoot the richer-than-nominal set point to the same extent as with first-stage regeneration alone. The resulting air-to-fuel ratio control action tends to be biased rich. Both the first and second stage regenerations work in concert to most effectively regenerate the three-way catalyst following a DFSO event.

Turning now to FIG. 4, a first embodiment of a two-stage regeneration method is shown. This and other methods may be stored in read-only memory 110 as computer code to be enacted by engine controller 12. The method 400 starts at 402 where it is determined if the vehicle is decelerating. If the vehicle is not decelerating (NO) the method returns to the start. If at 402, the vehicle is decelerating (YES) the method proceeds to 404. At 404, fuel is cut off for the duration of the deceleration event (DFSO). The method proceeds to 406.

At 406, it is determined if the catalyst temperature is greater than a threshold temperature. If the catalyst temperature is not greater than a threshold temperature (NO) the method proceeds to 408. At 408, the engine is not operated rich until the catalyst temperature is greater than the threshold temperature. If at 406, the catalyst temperature is above the threshold temperature (YES) the engine is operated rich by two-stage feedback control based on downstream HEGO sensor as indicated in FIG. 6.

Turning now to FIG. 5, a second embodiment of a method for a two-stage regeneration following DFSO is shown. The method 500 starts at 502 where it is determined if the vehicle is decelerating. If at 502, the vehicle is not decelerating (NO) the method returns to the start. If at 502, the vehicle is decelerating the method proceeds to 504. At 504, DFSO is enabled and fuel cut off for the duration of the deceleration event. The method proceeds to 506.

At 506, it is determined if the catalyst temperature is greater than the threshold temperature. If the catalyst temperature is not greater than the threshold temperature (NO) the method proceeds to step 508 where the engine is not operated rich until the catalyst temperature is greater than the threshold temperature. If the catalyst temperature is greater than the threshold temperature (YES) the method proceeds to 510.

At 510, the amount of oxygen stored in the catalyst is estimated. This estimate may be based on engine speed, load, and air/fuel ratio as well as input from an upstream UEGO or downstream HEGO, a catalyst temperature sensor and others. The estimate may be based specifically upon mass airflow inducted into the engine and catalyst temperature. At 512, the engine is operated rich. This rich operation may be part of a first-stage, open loop regeneration where rich operation proceeds for a predetermined period of time. At 514, the estimate for the amount of oxygen stored in the catalyst (from 510) is adjusted based on the rich operation of 512.

At 516, it is determined if the percentage of catalyst oxygen storage depleted by rich operation of the engine is greater than the desired percentage of the total oxygen storage. If the amount of oxygen storage depleted is not greater than the desired percentage (NO) the method returns to step 512 where the rich operation of the engine is continued. If the percentage of oxygen storage depleted is greater than the desired percentage (YES) the method proceeds to step 518. At 518, the air/fuel ratio is controlled by two-stage feedback control based on input from a downstream HEGO sensor as indicated in FIG. 6. In this way, switching from open loop control to feedback control to average air/fuel ratio around said value rich of stoichiometry may occur when a desired percentage of the catalyst oxygen storage is depleted. Furthermore, the predetermined time for operating by open loop control may be related to a preselected amount of oxygen storage remaining in the catalyst or catalyst temperature.

Turning now to FIG. 6, a method for maintaining an air/fuel ratio by a two-stage feedback control mechanism is shown. The method 600 details the voltage set point settings used to effectively control an air/fuel ratio and NOx emissions after DFSO. The method 600 also continues a first and second embodiment of the two-stage regeneration methods shown in FIG. 4 and FIG. 5 respectively. The method starts at 602 where the first embodiment shown in FIG. 4 and the second embodiment shown in FIG. 5 left off at 412 and 518 respectively. The method proceeds to 604 where an output voltage from a downstream HEGO sensor is read. The HEGO sensor 129 is positioned downstream of the exhaust gas after treatment device 178 (shown in FIG. 1).

At 606, it is determined if the predetermined time of the first stage regeneration has passed. If the preselected time has not passed (NO) the method proceeds to 608. At 608, open loop operation of the air/fuel ratio rich of stoichiometry is maintained until the predetermined time has passed. If the preselected time has passed (YES) the method proceeds to 610. At 610, the set point voltage is set to a voltage corresponding to rich of stoichiometry. The set point level and the pre-selected holding time may be related to the long term oxygen storage capacity of the catalyst (or better yet estimate of current oxygen level if available) or catalyst temperature. Alternatively, the set point may be reduced from the voltage rich of stoichiometry to a voltage associated with stoichiometry in a pre-programmed manner as shown, for example, in FIG. 2 beginning at 214. The fraction of decay for each time step can be a function of the same considerations used for set point level and holding time.

At 612, if the rich set point voltage has not been maintained for the pre-selected time, the rich set point is chosen (614). Once the time allotted for the rich set point has been exceeded, the method proceeds to 616, where for given time interval a specified fraction of the difference between the rich and nominal set point is subtracted from the current set point. 618 checks if the current set point has reached the nominal set point and if so proceeds to 620 to hold the set point, waiting for another DFSO occurrence. If the decaying set point has not reached nominal, then the loop will further decay at each subsequent update until it does reach nominal. The method proceeds to FIG. 7 where a method for adjusting fuel quantity is shown.

Turning to FIG. 7, a method for adjusting a fuel injection based on the HEGO set point mechanism as shown in FIG. 6. The method 700 begins at 702 where the difference between the HEGO set point and the measured HEGO voltage is used to create a commanded correction to the air fuel control system. The voltage error is typically translated into an appropriate air fuel ratio error (704) that is acted upon by a feedback controller in 706 (usually a proportional or proportional-integral) which provides a correction to either open loop fuel command to the fuel injectors or is acted upon by the inner loop controller to adjust fuel injection (708). The fuel PW determines the quantity of fuel that is injected into the cylinder (or intake port for port injection) such that a higher fuel PW corresponds to longer injector open time allowing a greater quantity of fuel to enter the cylinder. In this way, feedback from the downstream HEGO sensor 129 may be used to control fuel injection and thus air/fuel ratio. Further, corrections may be incorporated for fuel vapors purged from a fuel tank (not shown) and carbon storage canister (not shown) into the engine. Further still, long term variations or corrections in air/fuel ratio may be incorporated into the controller.

Methods are described for reducing NOx emissions following deceleration fuel shut off (DFSO). One example method comprises: cutting off fuel to the engine during a deceleration event; open loop operating the engine air/fuel ratio rich of stoichiometry for a predetermined time after said deceleration event; feedback controlling said air/fuel ratio on average around a value rich of stoichiometry for a preselected time after said predetermined time; and feedback controlling said air/fuel ratio on average around stoichiometry after said preselected time.

In another embodiment, a method for controlling an engine connected to a three-way catalytic converter with an exhaust gas oxygen sensor positioned downstream of the converter, may comprise: cutting off fuel to the engine during a deceleration event; operating an engine air/fuel ratio open loop at a constant air/fuel ratio rich of stoichiometry for a predetermined time after said deceleration event; feedback controlling said air/fuel ratio responsive to the exhaust gas oxygen sensor to average around a value rich of stoichiometry for a preselected time after said predetermined time; and feedback controlling said air/fuel ratio responsive to the exhaust gas oxygen sensor to average around stoichiometry after said preselected time.

Another example method for controlling an engine connected to a three-way catalytic converter with a narrow band two-state exhaust gas oxygen sensor positioned downstream of the converter, may comprise: cutting off fuel to the engine during a deceleration event; after said deceleration event, operating an engine air/fuel ratio open loop at a constant air/fuel ratio rich of stoichiometry for a predetermined time before the downstream sensor switches to a rich state and before oxygen stored in a catalyst is fully depleted; feedback controlling said air/fuel ratio responsive to the downstream sensor to average around a value rich of stoichiometry for a preselected time after said predetermined time; and feedback controlling said air/fuel ratio responsive to the downstream sensor to average returning to around stoichiometry after said preselected time.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine, comprising:
cutting off fuel to the engine during a deceleration event;
open loop operating an engine air/fuel ratio rich of stoichiometry for a predetermined time after said deceleration event ends;
feedback controlling said air/fuel ratio on average around a value rich of stoichiometry for a preselected time after said predetermined time; and
feedback controlling said air/fuel ratio to gradually return to stoichiometry after said preselected time.

2. The method recited in claim 1 wherein said feedback controlling is responsive to an air/fuel ratio indication from an exhaust gas oxygen sensor positioned downstream of a three-way catalytic converter which receives exhaust gases from the engine.

3. The method recited in claim 1 wherein said predetermined time is related to oxygen storage capacity of a catalyst.

4. The method recited in claim 1 wherein said predetermined time is related to duration of said deceleration event.

5. The method recited in claim 1 wherein said preselected time is related to oxygen storage capacity of a catalyst.

6. The method recited in claim 1 wherein said predetermined time is related to a temperature of a catalyst.

7. A method for controlling an engine connected to a three-way catalytic converter with an exhaust gas oxygen sensor positioned downstream of the converter, comprising:
cutting off fuel to the engine during a deceleration event;
operating an engine air/fuel ratio open loop at a constant air/fuel ratio rich of stoichiometry for a predetermined time after said deceleration event ends;
feedback controlling said air/fuel ratio responsive to the exhaust gas oxygen sensor to average around a value rich of stoichiometry for a preselected time after said predetermined time; and
feedback controlling said air/fuel ratio responsive to the exhaust gas oxygen sensor to gradually return to average around stoichiometry after said preselected time.

8. The method recited in claim 7 further comprising comparing an output of said exhaust gas oxygen sensor to a set point to indicate a HEGO voltage error and said feedback air/fuel ratio control is responsive to said error.

9. The method recited in claim 8 wherein said set point is changed to provide said value rich of stoichiometry during said preselected time.

10. The method recited in claim 8 wherein said set point is changed to provide said feedback controlling said air/fuel ratio around stoichiometry after said preselected time.

11. The method recited in claim 9 wherein said set point changes to gradually change from providing said value rich of stoichiometry to a stoichiometric value during said preselected time.

12. The method recited in claim 7 wherein said preselected time is related to said predetermined time.

13. The method recited in claim 8 further comprising determining oxygen storage capacity of a catalyst and wherein said set point is related to said oxygen storage capacity.

14. The method recited in claim 8 further comprising determining a temperature of a catalyst and wherein said set point is related to said catalyst temperature.

15. The method recited in claim 7 wherein said predetermined time and said preselected time are related to an oxygen storage capacity of a catalyst.

16. The method recited in claim 7 wherein said predetermined time and said preselected time are related to a catalyst temperature.

17. A method for controlling an engine connected to a three-way catalytic converter with a heated exhaust gas oxygen sensor positioned downstream of the converter, comprising:
cutting off fuel to the engine during a deceleration event;
after said deceleration event ends, operating an engine air/fuel ratio open loop at a constant air/fuel ratio rich of stoichiometry for a predetermined time before the downstream sensor switches to a rich state and before oxygen stored in a catalyst is fully depleted;

feedback controlling said air/fuel ratio responsive to the downstream sensor to average around a value rich of stoichiometry for a preselected time after said predetermined time; and feedback controlling said air/fuel ratio responsive to the downstream sensor to gradually return to average around stoichiometry after said preselected time.

18. The method recited in claim 17 wherein said operating the engine air/fuel ratio open loop at the constant air/fuel ratio rich of stoichiometry occurs in response to a catalyst temperature above a threshold; and further comprising, in response to the catalyst temperature below the threshold, not operating the engine air/fuel ratio open loop at the constant air/fuel ratio rich of stoichiometry.

19. The method recited in claim 17 further comprising estimating an amount of oxygen stored in the catalyst during said deceleration event, and decreasing said estimate while operating the engine air/fuel ratio rich of stoichiometry.

20. The method recited in claim 17 wherein said predetermined time is related to catalyst temperature.

\* \* \* \* \*